United States Patent [19]

Yagi et al.

[11] Patent Number: 5,140,229
[45] Date of Patent: Aug. 18, 1992

[54] LIGHTING CIRCUIT FOR VEHICULAR DISCHARGE LAMP

[75] Inventors: Soichi Yagi; Goichi Oda; Masatoshi Sugasawa, all of Shizuoka, all of Japan

[73] Assignee: Koito Manufacturing Co., Ltd., Tokyo, Japan

[21] Appl. No.: 668,573

[22] Filed: Mar. 12, 1991

[30] Foreign Application Priority Data

Apr. 28, 1990 [JP] Japan .................................. 2-112556

[51] Int. Cl.$^5$ .............................................. H05B 41/36
[52] U.S. Cl. ...................................... 315/307; 315/224; 315/219; 315/83; 315/308
[58] Field of Search ......... 315/307, 224, 362, DIG. 5, 315/ DIG. 7, 209 R, 77, 82, 83, 225, 219, 308; 363/50, 55, 56, 97, 131

[56] References Cited

U.S. PATENT DOCUMENTS

| | | | |
|---|---|---|---|
| 3,197,674 | 7/1965 | Hellman | 315/88 |
| 3,801,794 | 4/1974 | Mauch et al. | 315/97 X |
| 4,121,136 | 10/1978 | Fournier et al. | 315/307 X |
| 4,207,500 | 6/1980 | Duve et al. | 315/119 |
| 4,240,009 | 12/1980 | Paul | 315/224 |
| 4,337,418 | 6/1982 | Walz | 315/362 |
| 4,450,384 | 5/1984 | Krokaugger | 315/127 |
| 4,667,131 | 5/1987 | Nilssen | 315/275 |
| 4,724,360 | 2/1988 | Luursema | 315/244 |
| 4,763,044 | 8/1988 | Nuckolls et al. | 315/176 |
| 4,766,350 | 8/1988 | Husgen et al. | 315/224 X |
| 4,797,599 | 1/1989 | Ference et al. | 315/194 |
| 4,914,355 | 4/1990 | Mertens et al. | 315/307 |
| 4,992,702 | 2/1991 | Shimizu et al. | 315/DIG. 5 X |

Primary Examiner—Eugene R. LaRoche
Assistant Examiner—Ali Neyzari
Attorney, Agent, or Firm—Sughrue, Mion, Zinn Macpeak & Seas

[57] ABSTRACT

A lighting circuit for a vehicular discharge lamp has a DC voltage booster circuit, a control circuit, and a voltage drop detector. The booster circuit boosts an input voltage from a DC voltage input terminal to provide an output voltage to be applied to the discharge lamp. The control circuit functions for varying the output voltage of the DC booster circuit to effect lighting control including constant power control of the discharge lamp. The voltage drop detector detects a DC input voltage applied to the booster circuit. In response to a signal received from the voltage drop detector in accordance with a drop of the DC input voltage, the control circuit performs voltage boosting control to set power supplied to the dicharge lamp lower than the rated power. It is therefore possible to suppress an increase in current consumption and a consequent increase in generated heat when the DC input voltage drops. Further, the lighting circuit for a vehicular discharge lamp has a protection circuit which cuts off the supply of the DC input voltage to the DC voltage booster circuit when it is detected that the DC input voltage has dropped too low to maintain the lighting of the discharge lamp, and allows the DC input voltage to be supplied again to the booster circuit when the DC input voltage has been restored to or greater than a predetermined value. It is therefore possible to prevent the circuit elements from being deteriorated or destroyed due to an abnormal reduction in DC input voltage.

2 Claims, 6 Drawing Sheets

LIGHTING CIRCUIT FOR VEHICULAR DISCHARGE LAMP

BACKGROUND OF THE INVENTION

1. Field of the Invention

The present invention generally relates to a novel lighting circuit for a vehicular discharge lamp. More particularly, this invention pertains to a novel lighting circuit for a vehicular discharge lamp, adapted to boost the voltage from a DC power supply and then convert the voltage into an AC voltage to be applied to a discharge lamp, which lighting circuit reduces power loss originating from heat generation or the like due to reduction in the DC voltage to be supplied to the lighting circuit, thereby preventing the circuit elements from being deteriorated or damaged.

2. Description of the Related Art

Metal halide lamps have recently been receiving greater attention as a light source for vehicular headlamps. To always ensure stable supply of constant power to such a lamp with respect to a variation in a battery voltage is required as one of the important functions of a lighting circuit for the lamp.

A conventional lighting circuit is therefore designed to be able to cope with some fluctuation in battery voltage within the allowable range for the circuit.

Even if the battery voltage drops abnormally, however, the conventional lighting circuit tries to supply the constant power to the lamp. This will troublesomely increase the consumption of the battery current and thus increase the power loss caused by generation of heat or the like.

In particular, if such a reduction in battery voltage continued under a high-temperature environment, it could heat up the circuit elements, thus deteriorating these elements or even destroying them at worst.

SUMMARY OF THE INVENTION

Accordingly, it is an object of the present invention to provide an improved lighting circuit for a vehicular discharge lamp, which can overcome the above shortcoming.

To achieve the object, according to one aspect of the present invention, in a lighting circuit for a vehicular discharge lamp having a DC voltage booster circuit for boosting an input voltage from a DC voltage input terminal and a control circuit for varying the output voltage of the DC voltage booster circuit to execute lighting control including constant power control of the discharge lamp, the improvement comprises a voltage drop detector for detecting a DC input voltage applied to the DC voltage input terminal, whereby in response to a signal received from the voltage drop detector in accordance with a drop of the DC input voltage, the control circuit performs voltage boosting control to make power supplied to the discharge lamp lower than rated power.

With this arrangement, it is possible to suppress an increase in current consumption, and a consequent increase in generated heat when the DC input voltage drops.

Further, a protection circuit may be provided which cuts off the supply of the DC input voltage to the DC voltage booster circuit when the supplied voltage drop detector detects that the DC input voltage has dropped to a level at which lighting of the discharge lamp is no longer possible, and allows the DC input voltage to be supplied again to the DC voltage booster circuit when the DC input voltage has been restored to or greater than a predetermined value.

With this structure, it is possible to prevent the circuit elements from being deteriorated or destroyed due to abnormal reduction in DC input voltage.

BRIEF DESCRIPTION OF THE DRAWINGS

FIGS. 1 through 6 illustrate one embodiment of a lighting circuit for a vehicular discharge lamp according to the present invention.

DETAILED DESCRIPTION OF THE PREFERRED EMBODIMENT

A preferred embodiment of a lighting circuit for a vehicular discharge lamp according to the present invention will be described in detail below with reference to the accompanying drawings. The illustrated embodiment is a lighting circuit for a metal halide lamp for automobiles to which the present invention is applied.

General Structure

Figure 1:
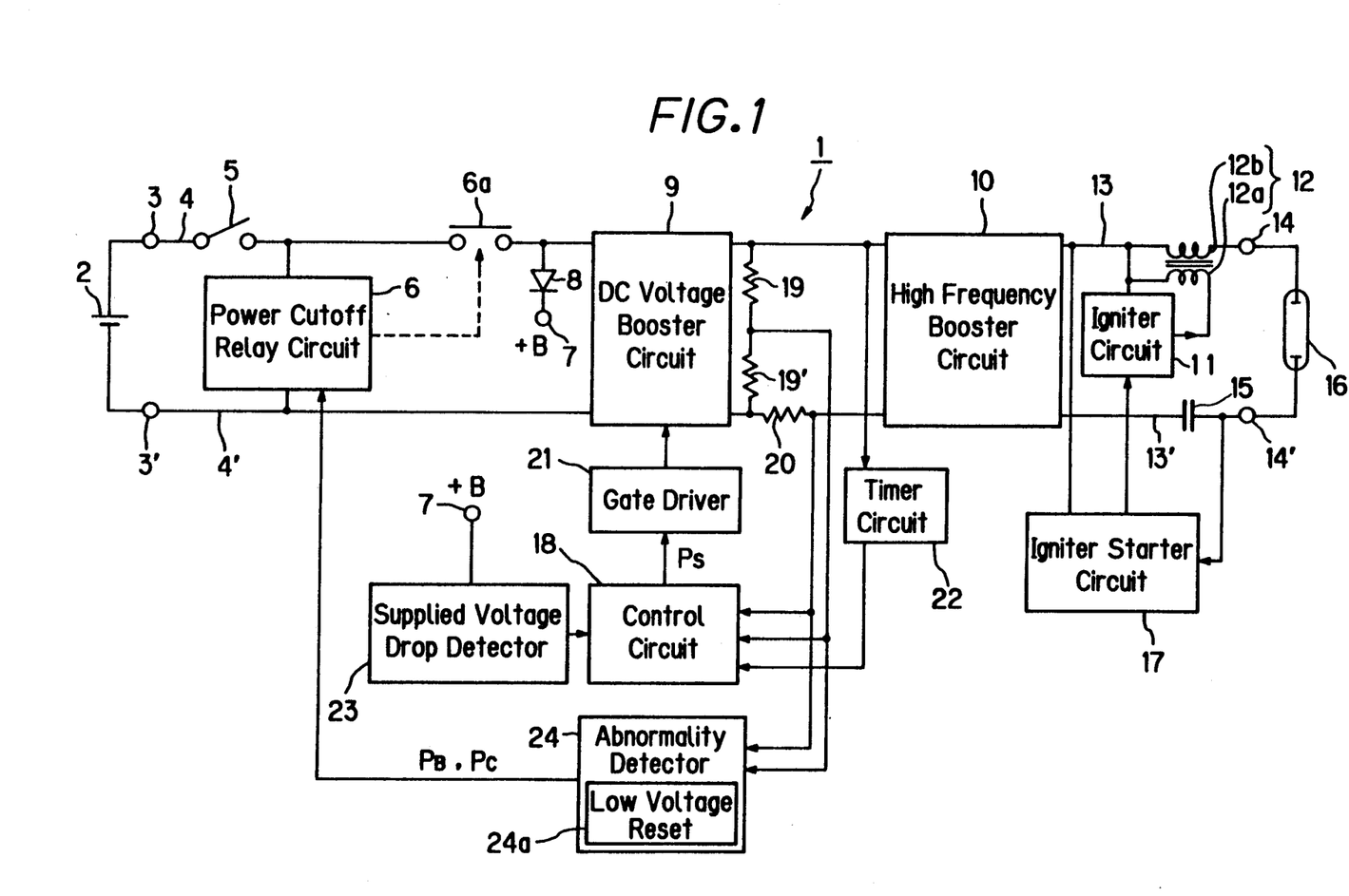
FIG. 1 is a circuit block diagram illustrating the general circuit structure.

Referring to FIG. 1, a lighting circuit 1 has a battery 2 which provides a DC voltage of 12 volts. The battery 2 is connected between input terminals 3 and 3' of the lighting circuit.

Reference numerals 4 and 4' denote DC power supply lines. A lighting switch 5 is connected to the positive line 4.

Upon reception of a signal from an abnormality detector (to be described later) when an abnormality occurs in the lighting circuit 1, a power cutoff relay circuit 6 opens a relay contact 6a provided on the positive line 4 to stop the supply of the power supply voltage to circuits located at the subsequent stage.

A power supply terminal 7 is provided to extract a power supply voltage through a diode 8 at the subsequent stage of the relay contact 6a. This power supply voltage (B (V)) is supplied to a control circuit, etc., which will be described later.

A DC voltage booster circuit 9 is provided at the subsequent stage of the power cutoff relay circuit 6. This booster circuit 9 boosts a battery voltage under the control of the control circuit (to be described later).

A high frequency booster circuit 10 is provided at the subsequent stage of the DC voltage booster circuit 9. This booster circuit 10 converts the DC voltage of the booster circuit 9 into a sinusoidal AC voltage. An inverter circuit of a push/pull type may serve as the high frequency booster circuit 10.

An igniter circuit 11 generates a lamp trigger pulse upon reception of a signal from an igniter starter circuit (which will be described later) at the beginning of lighting up a lamp, and applies the pulse to a primary winding 12a of a trigger transformer 12.

AC output lines 13 and 13' connect the output terminals of the booster circuit 10 to AC output terminals 14 and 14'. The line 13 is connected to a secondary winding 12b of the trigger transformer 12, while the other line 13' is connected to a capacitor 15. The capacitor 15 together with the secondary winding 12b constitutes a current limiting load, and also serves to detect a lamp current.

A metal halide lamp 16 having a rated power of 35 W is connected between the AC output terminals 14 and 14'.

An igniter starter circuit 17 detects whether or not the metal halide lamp 16 is turned on based on the lamp current detected by the capacitor 15, and supplies a signal for generating a trigger pulse to the igniter circuit 11 when the lamp is not yet lit up.

A control circuit 18 generates early after lighting up of the lamp, a control pulse ($P_S$) with a duty cycle according to the output voltage of the DC voltage booster circuit 9 detected through voltage-dividing resistors 19 and 19' provided between the output terminals of the DC voltage booster circuit 9 and a voltage applied through a current detecting resistor 20 provided to convert the output current of the DC booster circuit 9 on a ground line connecting the input terminal of DC voltage booster circuit 9 with the input terminal of the high-frequency booster circuit 10, and then sends the signal $P_S$ to the booster circuit 9 through a gate driver 21 to control the output voltage of the booster circuit 9.

In response to the output voltage of the DC voltage booster circuit 9 received through a timer circuit 22, the control circuit 18 changes its control mode to constant power control for the lamp upon the elapse of a time period determined according to the turn-off time of the lamp after the lamp started lighting. This control transition is effected because the start-up time would be longer if constant power control were executed immediately upon the beginning of the lamp lighting. This will be described more specifically later.

A voltage drop detector 23 sends a signal to the control circuit 18 when the voltage B at the power supply terminal 7 falls below a predetermined level, thereby controlling the metal halide lamp 16 with control power smaller than the rated power.

An abnormality detector 24 detects an abnormality of the circuit from the relation between the output voltage and output current of the DC voltage booster circuit 9. Upon detection of an abnormality, the detector 24 sends a signal to the power cutoff relay circuit 6 to cut off the power supply. The abnormality detector 24 has a low voltage reset circuit 24a, which sends a signal to the power cutoff relay circuit 6 to turn off the lamp when the battery voltage drops abnormally too low to maintain the lighting of the lamp. When the battery voltage is restored to a level equal to or greater than a predetermined level, the lamp lighting operation restarts.

Figure 2:
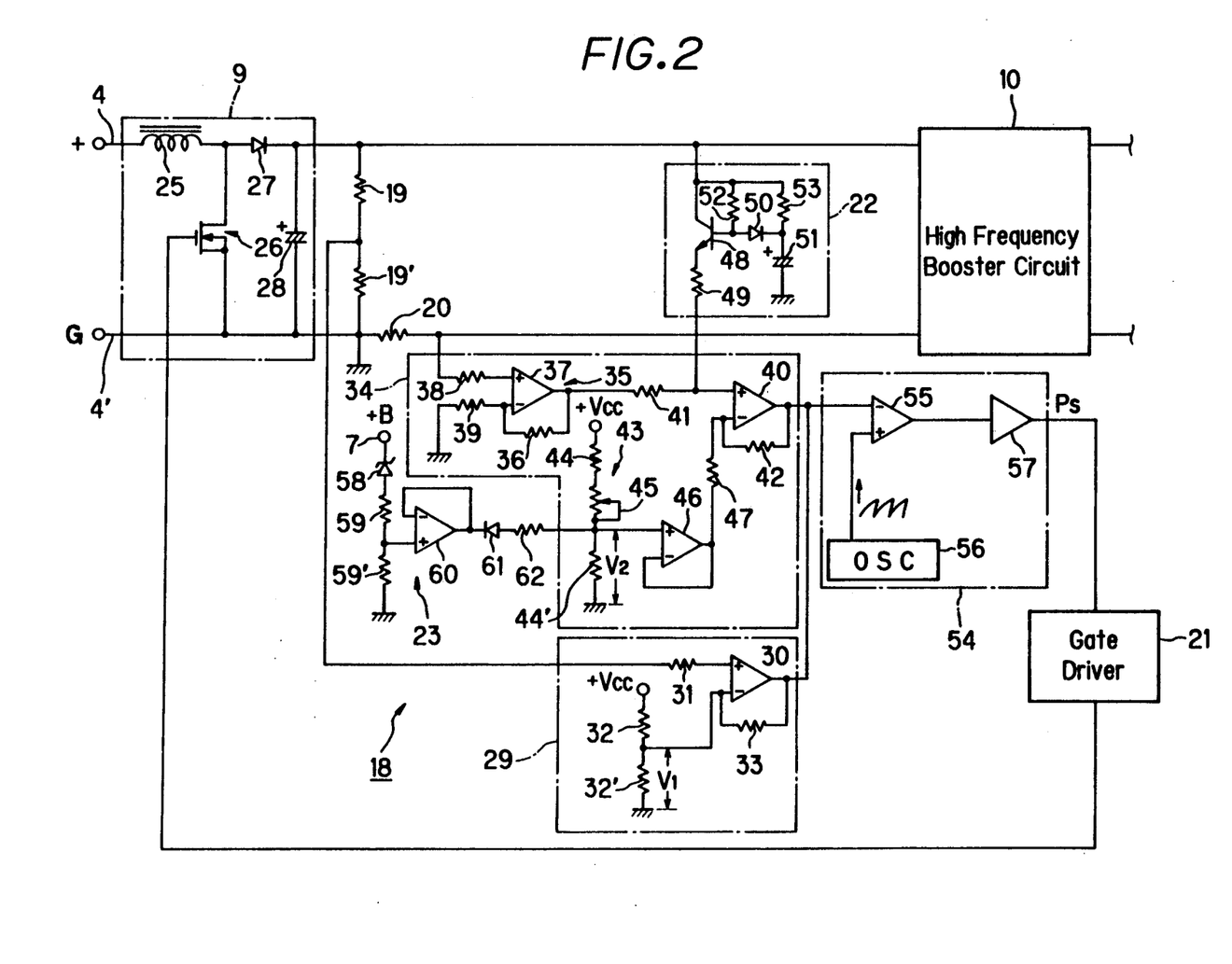
FIG. 2 is a circuit diagram showing the circuit configuration of essential portions.

Essential portions of the lamp lighting circuit 1 will be described in detail below.

DC Voltage Booster Circuit

The booster circuit 9, constituted as a chopper type DC-to-DC converter, includes an inductor 25 connected to the positive line 4, an N channel FET 26, a rectifier diode 27 and a smoothing capacitor 28. The FET 26 is located at the subsequent stage of the inductor 25 and is connected between the positive line 4 and the ground line 4'. The FET 26 performs its switching operation in response to a control pulse $P_S$ sent through the gate driver 21 from the control circuit 18. This rectifier diode 27 on the positive line 4 has its anode connected to the drain of the FET 26. The smoothing capacitor 28 is connected between the cathode of the rectifier diode 27 and the ground line 4'. The inductor 25 stores energy when the FET 26 becomes conductive in response to the control pulse $P_S$ sent through the gate driver 21 from the control circuit 18. When the FET 26 becomes nonconductive, the inductor 25 releases the stored energy, with the consequent superposition of the corresponding voltage on the input voltage, thereby boosting the DC voltage.

Control Section

Output Voltage Detector Section

An output voltage detector section 29 detects the output voltage of the DC voltage booster circuit 9 through the voltage-dividing resistors 19 and 19', compares the detected voltage with a predetermined reference value, and outputs the voltage difference as an error output.

An operational amplifier 30 serving as an error amplifier has its non-inverting input terminal connected between the voltage-dividing resistors 19 and 19' through a resistor 31, and its inverting input terminal supplied with a predetermined reference voltage ($V_1$ (V)) specified by voltage-dividing resistors 32 and 32'. To one end of the resistor 32 is applied a predetermined voltage ($+V_{CC}$ (V)) from a power supply circuit (not shown).

A feedback resistor 33 is connected between the output terminal and non-inverting input terminal of the operational amplifier 30.

Output Current Detector Section

An output current detector section 34 detects the output current of the DC voltage booster circuit 9 as a voltage-converted value through the current-detecting resistor 20, compares the detected value with a predetermined reference value, and outputs the voltage difference as an error output.

An amplifier circuit 35 is constituted by an operational amplifier 37 and a resistor 36, which are connected in a negative feedback arrangement. The operational amplifier 37 has its non-inverting input terminal connected via a resistor 38 to one end (the non-ground side) of the current-detecting resistor 20 and its inverting input terminal grounded through a resistor 39.

An operational amplifier 40 serving as an error amplifier has its non-inverting input terminal connected via a resistor 41 to the output terminal of the operational amplifier 37, and its inverting input terminal supplied with a reference voltage ($V_2$ (V)) by a reference voltage generator section 43.

A feedback resistor 42 is connected between the output terminal and inverting input terminal of the operational amplifier 40.

The reference voltage generator section 43 comprises a resistor 44, a variable resistor 45, a resistor 44' and a voltage buffer 46. These three resistors 44, 45 and 44' are connected in series. The voltage buffer 46 receives the voltage between the variable resistor 45 and resistor 44. The output of the voltage buffer 46 is applied to the non-inverting input terminal of the operational amplifier 40 through a resistor 47. To one end of the resistor 44 is applied a predetermined voltage (+$V_{cc}$) from the power supply circuit (not shown).

Timer Circuit

A timer circuit 22 is provided to ensure transition to constant power control upon elapse of a time period corresponding to the turn-off time of the lamp after the lamp starts lighting. This timer circuit 22 includes an active switch device and a time constant circuit.

An NPN transistor 48 has its collector connected to the positive output terminal of the DC voltage booster circuit 9 and its emitter connected via a resistor 49 to the non-inverting input terminal of the operational amplifier 40.

The transistor 48 has its base connected to the anode of a diode 50 whose cathode is grounded through a capacitor 51 (its electrostatic capacity being denoted by $C_{51}$).

A resistor 52 (having a resistance $R_{52}$) is connected between the base and collector of the transistor 48, and a resistor 53 (having a resistance $R_{53}$) is connected between the cathode of the diode 50 and the collector of the transistor 48.

PWM Section

A PWM section 54 includes a comparator 55, which compares the input voltage with a saw-tooth voltage from an oscillator 56. Based on the comparison result, the PWM section 54 generates the control pulse $P_S$ having a duty cycle determined according to the input voltage.

More specifically, the comparator 55 has its negative input terminal connected to the output terminals of the operational amplifiers 30 and 40 and its positive input terminal connected to the output terminal of the oscillator 56.

The output signal of the comparator 55 is sent through a buffer 57 to the gate driver 21.

With the above structure, the PWM section 54 produces the control pulse $P_S$ with a duty cycle corresponding to the output voltage of the operational amplifier 30 or 40, and feeds the pulse through the gate driver 21 back to the gate of the FET 26 of the DC voltage booster circuit 9 to thereby control the output voltage of the circuit 9. Though not shown, a circuit for specifying the maximum value of the duty cycle of this control pulse Ps is also provided.

Voltage Drop Detector

The voltage drop detector 23 varies a reference voltage $V_2$ in the output current detector section 34 in accordance with a reduction in power supply voltage B to suppress the power applied to the metal halide lamp 16.

The detector 23 includes a Zener diode 58 and a voltage buffer 60. The Zener diode 58 has its cathode connected to the power supply terminal 7 and its anode grounded through resistors 59 and 59'. The voltage buffer 60, which receives the voltage between the resistors 59 and 59', has its output terminal connected to the cathode of a diode 61. This diode 61 has its anode connected via a resistor 62 between the variable resistor 45 and resistor 44' of the reference voltage generator section 43.

Power Cutoff Relay Circuit

A power supply terminal 63 is connected via a diode 64 to the line connecting the lighting switch 5 and the relay contact 6a.

The power cutoff relay circuit 6 includes an NPN transistor 65, a relay coil 66, a diode 67, a base resistor 68 of the transistor 65, and a resistor 70. The NPN transistor 65 has its collector connected via a relay coil 66 to the power supply terminal 63, and its emitter connected to the ground line 4'. The contact 6a is closed by the excitation of the relay coil 66. The diode 67, which is provided in reversely parallel to the relay coil 66, serves to absorb pulses reversely applied. The base resistor 68 has one end coupled to a control terminal 69. The control terminal 69 is supplied with a signal ($P_B$) from the low voltage reset circuit 24a (to be described later) or a signal ($P_C$) generated from the abnormality detector 24 upon detection of an abnormality other than the reduction in battery voltage (for example, the lamp is disabled to light up). The resistor 70 is inserted between the power supply terminal 63 and the control terminal 69.

Low Voltage Reset Circuit

Figure 3:
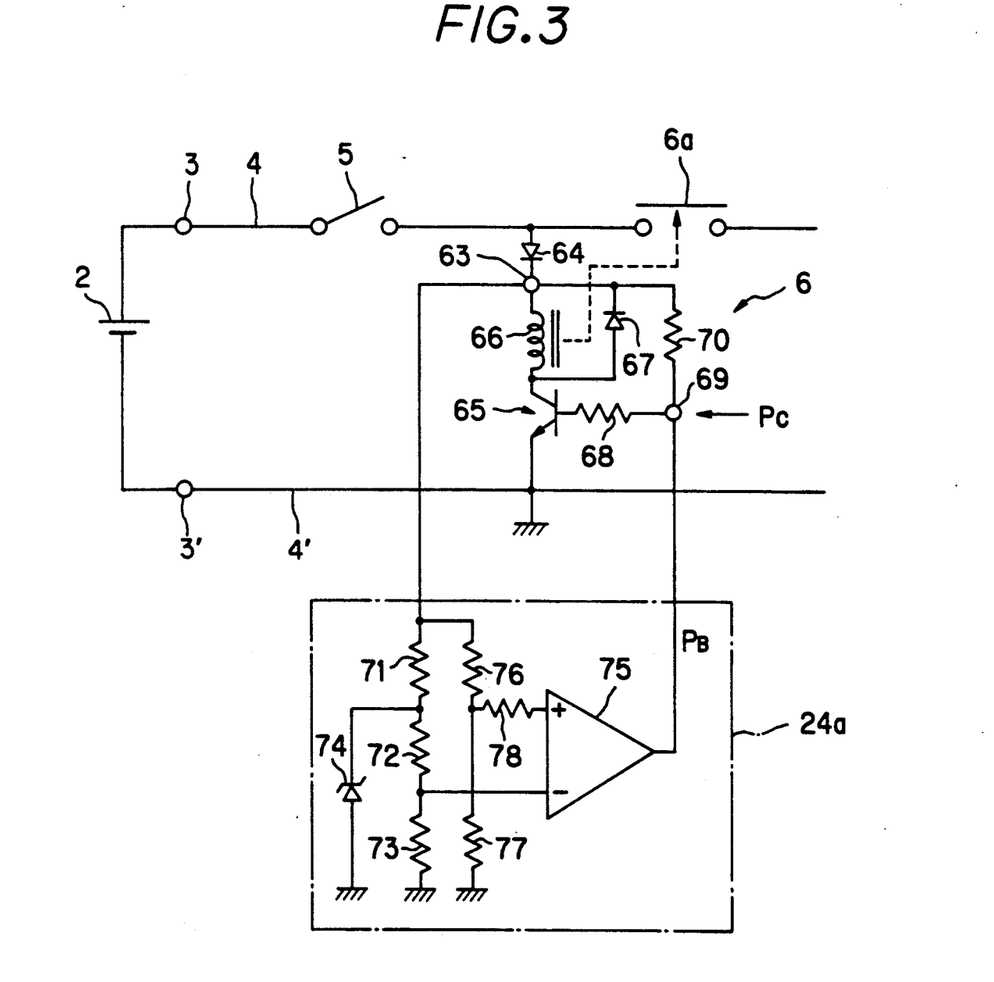
FIG. 3 is a circuit diagram of a low voltage reset circuit.

The low voltage reset circuit 24a receives the power supply voltage from the power supply terminal 63 to detect reduction in battery voltage.

The reset circuit 24a includes resistors 71 to 73, a Zener diode 74, and an operational amplifier 75. The resistor 71 has its one end connected to the power supply terminal 63 and the other end grounded through the resistors 72 and 73. The Zener diode 74, connected in parallel to the resistors 72 and 73, has its cathode connected between the resistors 71 and 72 and its anode grounded. The operational amplifier 75 serving as a comparator has its inverting input terminal connected between the resistors 72 and 73, and its non-inverting input terminal is supplied with a voltage acquired by voltage-dividing, by means of voltage-dividing resistors 76 and 77, the voltage applied to the power supply terminal 63.

The output terminal of the comparator 75 is coupled to the control terminal 69 of the power cutoff relay circuit 6.

Control Operation

Figure 4:
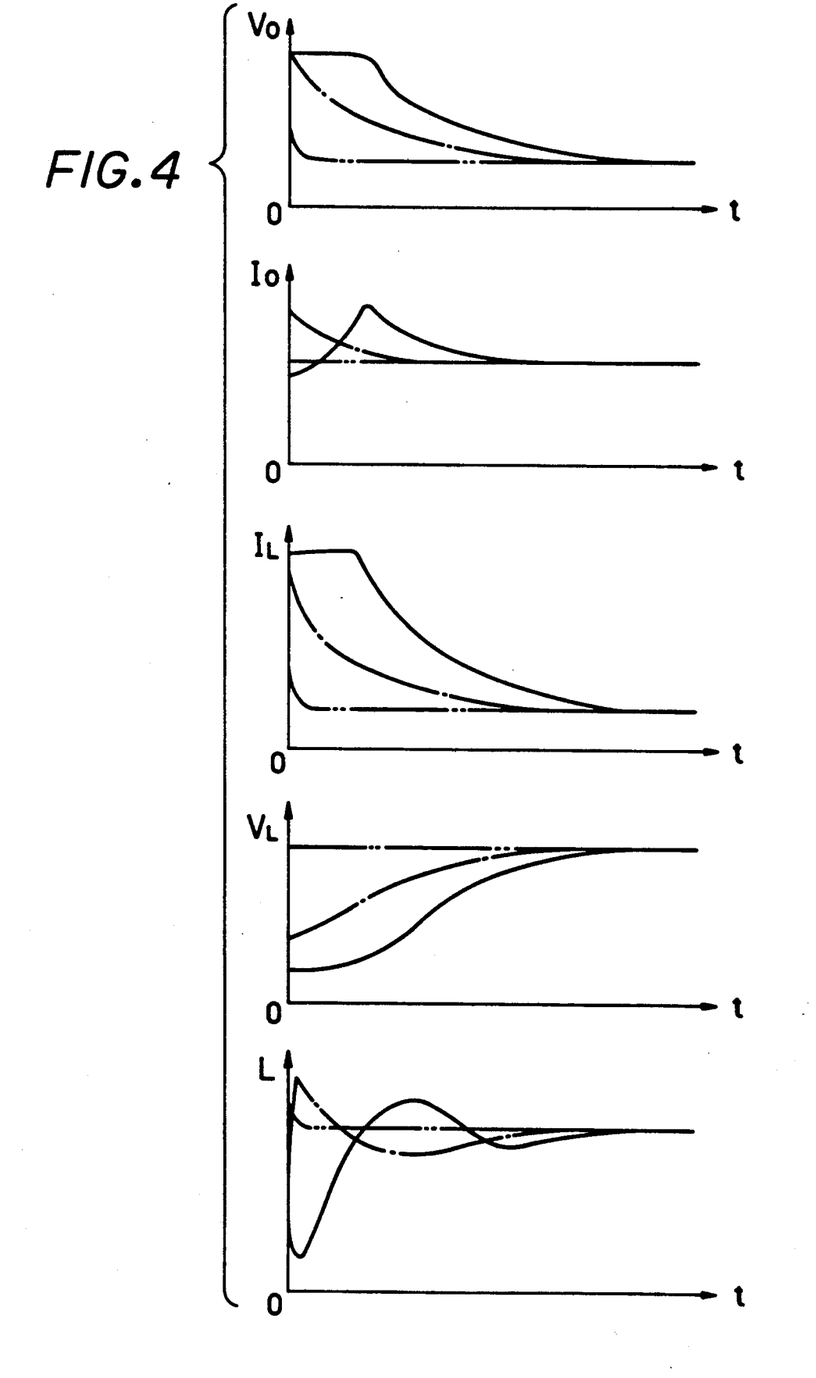
FIG. 4 shows graphs schematically illustrating changes over time in currents and voltages of individual circuit components and changes in the flux of light from a lamp for explaining a control operation.
Figure 5:
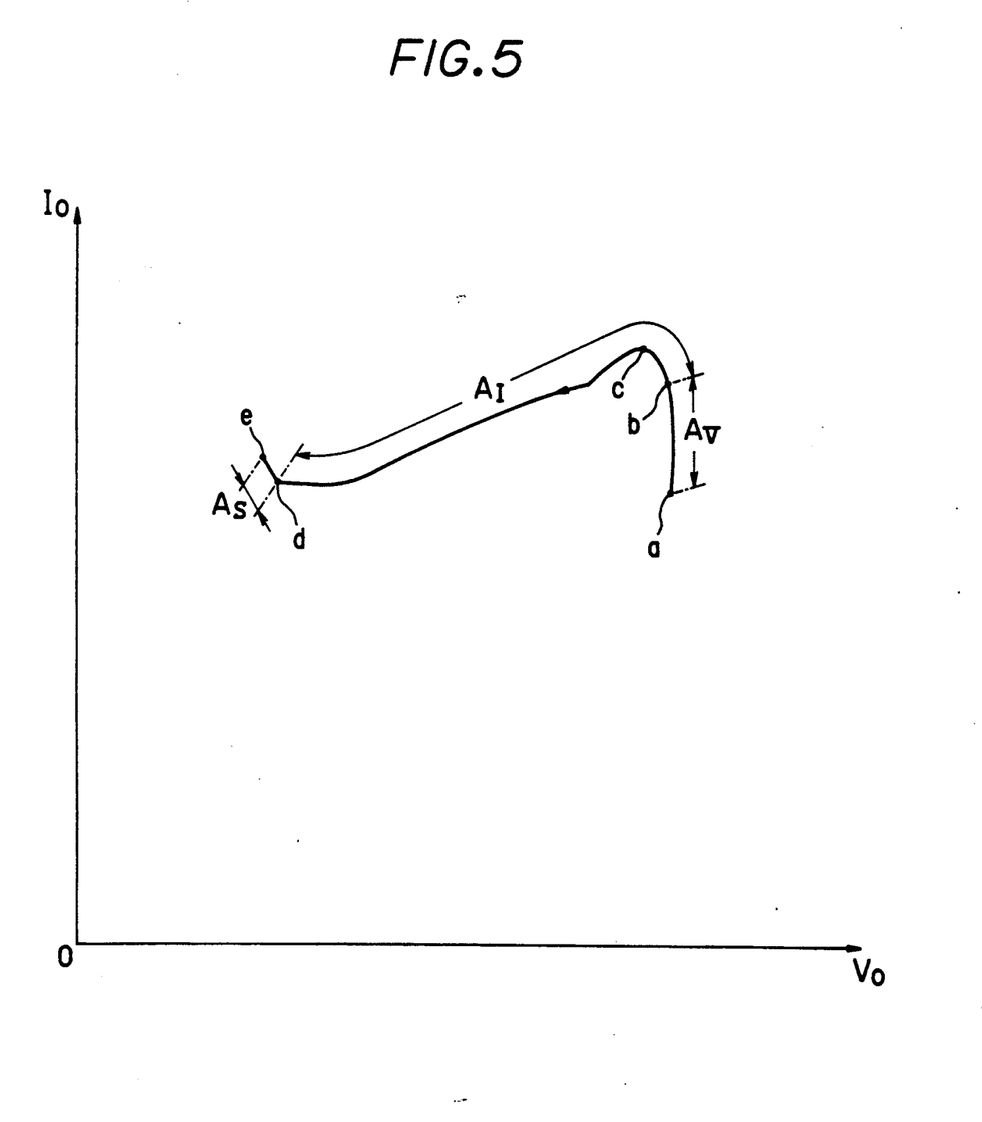
FIG. 5 is a graph illustrating the relation between the output voltage and output current of a DC voltage booster circuit.
Figure 6:
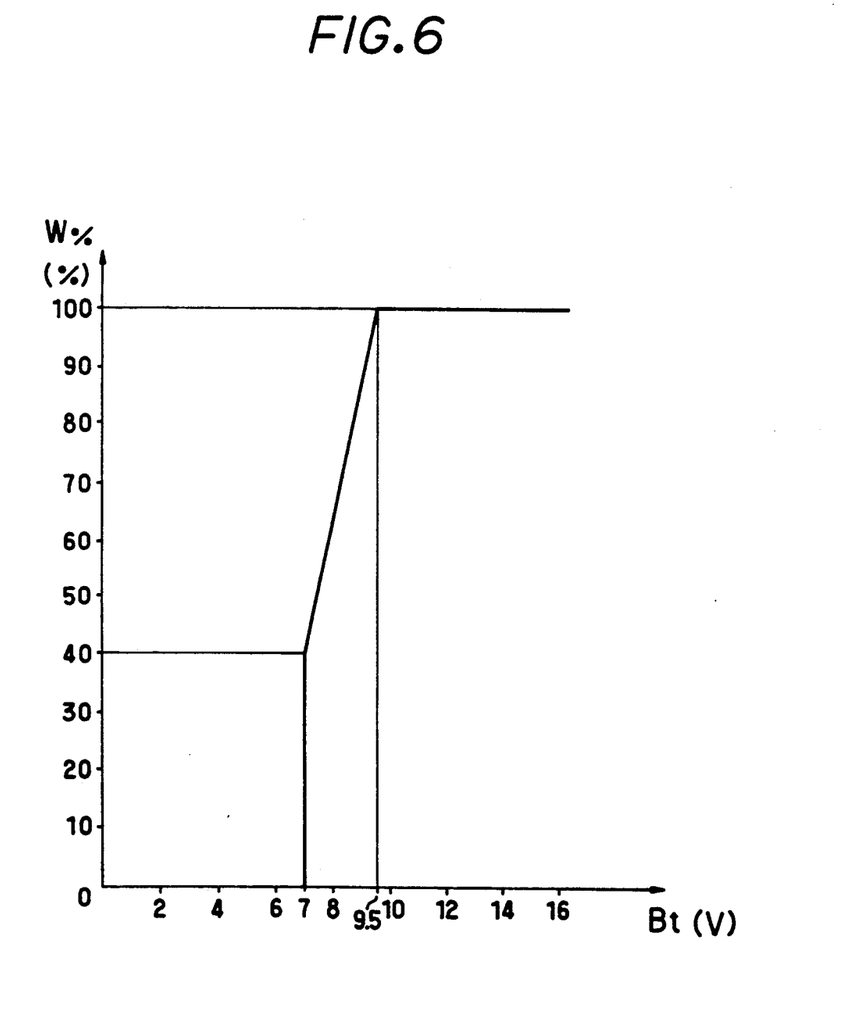
FIG. 6 is a graph showing the relation between the battery voltage and lamp power.

Referring now to FIGS. 4 to 6, the control operation of the lighting circuit 1 will be described with reference to two cases: the first case where the circuit status is normal and the metal halide lamp 16 is lit up immediately after turning the lighting switch 5 ON (hereinafter referred to as "normal time") and the second case where an abnormality occurs in the circuit (hereinafter referred to as "abnormal time").

FIG. 4 schematically illustrates changes with passage of time in the output voltage $V_O$(V) and output current $I_O$(A) of the booster circuit 9, the lamp current $I_L$ (A), the lamp voltage $V_L$ (V) and the flux of light, L (lm), from the metal halide lamp 16. The origin of the time axis t corresponds to the time at which the light switch 5 is closed. FIG. 5 presents a graph illustrating the relation between the output voltage $V_O$ taken on the horizontal scale and the output current $I_O$ taken on the vertical scale.

Normal Time

First, a description will be given regarding the environment at the time the lamp 16 starts lighting up with its glass bulb being cold.

In this case, immediately after closure of the lighting switch 5, the capacitor 51 of the timer circuit 22 is empty and the emitter potential of the transistor 48 is low. Accordingly, only the output of the amplifier 35 is applied to the non-inverting input terminal of the operational amplifier 40 in the output current detector section 34.

Immediately after the lamp is lit, however, as is clear from the solid-line graph in FIG. 4, the lamp voltage $V_L$ will be low, as will be the output current $I_O$ of the DC voltage booster circuit 9.

In other words, the output of the amplifier 35 (corresponding to the output current $I_O$) is smaller than the reference voltage $V_2$ from the reference voltage generator section 43, so that the output of the operational amplifier 40 becomes an L (low) level.

Therefore, the PWM section 54 generates the control pulse $P_S$ having a duty cycle determined by the output voltage of the operational amplifier 30 of the output voltage detector section 29, which control pulse is sent through the gate driver 21 to the FET 26 of the DC voltage booster circuit 9.

The reference voltage $V_1$ in the output voltage detector section 29 is so set as to make the output voltage $V_O$ of the booster circuit 9 high (about 2.5 to 3 times the one obtained in the normal state), thus making the output voltage $V_O$ maximum.

The point "a" in FIG. 5 indicates the state immediately after the lighting of the lamp. A control region $A_V$ from the point "a" to the point "b" to which the output current $I_O$ gradually increases, with the output voltage $V_O$ being approximately constant, is under the control of the output voltage detector section 29.

Then, as the capacitor 51 is being gradually charged, the emitter potential of the transistor 48 increases and the potential at the non-inverting input terminal of the operational amplifier 40 increases. Given that the time constant at this time is $\tau S_1$, then $\tau S_1 = (R_{52} \| R_{53}) \cdot C_{51}$, where " $\|$ " represents a parallel summation of the resistances.

When this potential reaches the level corresponding to the reference voltage $V_2$, thereafter the duty cycle of the control pulse $P_S$ will be determined by the output voltage of the operational amplifier 40.

That is, as the duty cycle of the control pulse $P_S$ decreases with an increase in output voltage of the operational amplifier 40, the output voltage $V_O$, which has been held at a maximum, will gradually decrease.

In FIG. 5, a control region $A_I$ from the point "b" to the point "d" passing through the peak point "c" of the output current $I_O$ is controlled by the output current detector section 34.

When the capacitor 51 becomes fully charged, the transistor 48 is turned ON and its emitter potential nearly equals the output voltage $V_O$ of the booster circuit 9. Thereafter, the control mode changes to the constant power control.

That is, since control is executed in such a way that the sum of the output voltage $V_O$ voltage-divided by the resistance ratio of the resistors 41 and 49 and the amplified output corresponding to the output current $I_O$ becomes a constant value corresponding to $V_2$, constant power control with $V_O \cdot I_O$ being constant is realized in the form of a linear approximation.

A region $A_S$ from the point "d" to the point "e" in FIG. 5 is a constant power region where the rated power is supplied to the metal halide lamp 16.

Thus, the flux L of the lamp rises steeply immediately after the lighting up and shifts to the normal state after going through an overshoot.

A description will now be given regarding the operation for lighting the metal halide lamp 16 again after it has been temporarily turned off.

During the time the lamp is off, the charge stored in the capacitor 51 of the timer circuit 22 is gradually discharged with a time constant $\tau_2 (= R_{53} \cdot C_{51})$.

This time constant $\tau_2$ is determined according to the rate of reduction in temperature of the lamp after being turned off. When the lighting switch 5 is closed again, therefore, the lighting operation starts from the control region corresponding to the terminal voltage of the capacitor 51.

That is, proper lighting control is performed in accordance with the elapsed time required for relighting the lamp after it has once been turned off.

For instance, in the case where the metal halide lamp 16 is lit up again several tens of seconds after the lamp was previously turned off, the lighting of the lamp starts from the operational point in the control region $A_I$ and the control mode changes to constant power control. Therefore, the output voltage $V_O$ and output current $I_O$ gradually decrease from the beginning of the lighting of the lamp, as shown by respective one-dot chain lines in FIG. 4, and the flux L of light from the lamp rises sharply at the beginning and becomes stable after going through an overshoot.

In the case where the metal halide lamp 16 is lit up again several seconds after it was temporarily turned off, the glass bulb of the metal halide lamp 16 is still hot. As is clear from the curves indicated by the two-dot chain lines in FIG. 4, the lamp voltage $V_L$ immediately after the relighting of the lamp 16 is high and the output current $I_O$ is high, thereby causing an immediate shift to constant power control, whereupon the flux L becomes stable at the rated power.

The timer circuit 22 is provided to shorten the start-up time. That is, if the timer circuit 22 were not provided and the output voltage $V_O$ of the DC voltage booster circuit 9 were directly applied to the non-inverting input terminal of the operational amplifier 40 via the resistor 49, constant power control would be executed from the beginning of the lighting of the lamp irrespective of the physical conditions of the lamp, so that the light emission from the lamp would not progress through the control region $A_V$ or $A_I$. This would delay the rise of the flux L of light.

Abnormal Time

A description will now be given regarding the case where the battery voltage is reduced.

If the battery voltage is equal to or greater than a predetermined value, for example, 9.5 V, the output voltage of the voltage buffer 60 becomes higher than the input voltage of the voltage buffer 46 in the reference voltage generator section 43 (the diode 61 being turned off during this time), so that the value of the reference voltage $V_2$ is determined by the resistors 44 and 44' and the variable resistor 45.

If the battery voltage is equal to or lower than 9.5 V, however, the output voltage of the voltage buffer 60 becomes lower than the voltage from the reference voltage generator section 43, and the diode 61 is turned on, thus reducing the reference voltage $V_2$.

Therefore, power lower than the rated power is supplied to the metal halide lamp 16 in accordance with the reduction in power supply voltage B.

When the battery voltage is further reduced and the battery 2 cannot further maintain the lighting of the lamp, the low voltage reset circuit 24a starts functioning.

More specifically, when the battery voltage becomes equal to or lower than a predetermined value, for example, 7 V, this voltage is detected by the voltage-dividing resistors 76 and 77 and is compared with a reference voltage (determined by the resistors 71 to 73 and the Zener diode 74) by the operational amplifier (comparator) 75. The amplifier 75 then sends an L (low) signal as the signal $P_B$ to the transistor 65 of the voltage cutoff relay circuit 6 to turn on the transistor and cut off the power supply to the relay coil 66 connected to the DC lines 4 and 4', whereupon the relay contact 6a is opened.

At the time the battery voltage returns to 7 V or greater, the output of the operational amplifier 75 becomes an H (high) level, turning on the transistor 65, and the relay contact point 6a is closed so that the lighting operation resumes.

FIG. 6 exemplifies the status of low power control and the power cutoff status when the battery voltage is reduced with the flux stabilized.

Referring to FIG. 6, the horizontal scale represents the battery voltage ($B_t$), and the vertical scale the lamp power (W %) with respect to the rated power of the metal halide lamp 16 being 100%.

As is clear from the diagram, constant power control with the rated power is effected in the region of $B_t \geq 9.5$, while the lamp power W % linearly falls to 40% from 100% in the region of $7 < B_t < 9.5$ and lessens down to zero (W % = 0) by the low voltage reset circuit 24a when $B_t \leq 7$.

The abnormality detector 24 has a circuit for detecting an abnormal state, such as the metal halide lamp 16 becoming incapable of emitting light due to normal deterioration at the end of its service life, or the output stage of the high frequency booster circuit 10 becoming an open circuit. In this case, the abnormal state will be maintained unless the transistor 65 is turned off by the signal $P_C$, opening the relay contact 6a, and the lighting switch 5 is opened temporarily and is closed again.

Regarding the aforementioned lighting circuit 1, when the power supply voltage B drops, the voltage drop detector 23 sets the reference voltage $V_2$ of the reference voltage generator section 43 lower. As a result, power equal to or lower than the rated level and corresponding to the reduction in this voltage B is supplied to the metal halide lamp 16, thus reducing power loss originating from an increase in consumed battery current.

When the battery voltage falls too low to maintain the lighting of the lamp 16, the low voltage reset circuit 24a cuts off the supply of the power supply voltage from the battery 2 to the DC voltage booster circuit 9, thus making it possible to prevent the worst case of destroying the circuit elements.

As is clear from the foregoing description, according to the present invention, in a lighting circuit for a vehicular discharge lamp having a DC voltage booster circuit for boosting an input voltage from a DC voltage input terminal and a control circuit for varying the output voltage of the DC voltage booster circuit to execute lighting control including constant power control of the discharge lamp, the improvement comprises a voltage drop detector for detecting a DC input voltage applied to the DC voltage input terminal, whereby in response to a signal received from the supplied voltage drop detector in accordance with a drop of the DC input voltage, the control circuit performs voltage boosting control to set power supplied to the discharge lamp lower than rated power.

With this arrangement, as low power control involving power equal to or lower than the rated power for the discharge lamp is effected in accordance with the reduction in DC input voltage, it is possible to suppress an increase in the amount of generated heat caused by the increase in current consumption at the time the voltage drop occurs, thus reducing the power loss.

Another feature of the present invention lies in the provision of a protection circuit which cuts off the supply of the DC input voltage to the DC voltage booster circuit when detecting that the DC input voltage has dropped to a level at which lighting of the discharge lamp is no longer possible, and allows the DC input voltage to be supplied again to the DC voltage booster circuit when the DC input voltage has been restored to or greater than a predetermined value.

Accordingly, it is possible to prevent the circuit elements from being deteriorated or destroyed due to abnormal reduction in DC input voltage.

Although only one embodiment of the present invention has been described above, this embodiment is to be considered as illustrative and not restrictive, and the invention is not limited to the details given above, but may be modified in various manners within the scope and spirit of the invention. For instance, although the control circuit in the above embodiment performs a control operation for varying the output voltage of the DC voltage booster circuit to execute lighting control, it may be designed to detect the lamp voltage and current and effect lighting control (including constant power control) according to the detection result.

What is claimed is:

1. In a lighting circuit for a vehicular discharge lamp having a DC voltage booster circuit for boosting an input voltage from a DC voltage input terminal to provide an output voltage to be applied to the discharge lamp, and a control circuit for varying the output voltage of the DC voltage booster circuit to execute lighting control including constant power control of the discharge lamp, the improvement comprising:
 a voltage drop detector for detecting a DC input voltage applied to the DC voltage input terminal,
 an output voltage detector for detecting the output voltage of the DC voltage booster circuit and outputting a signal corresponding to a difference between the detected output voltage and a reference value; and
 an output current detector for detecting an output current of the DC voltage booster circuit and outputting a signal corresponding to a difference between the detected output current and a reference value,
 whereby in response to a signal received from the voltage drop detector in accordance with a drop of the DC input voltage below a predetermined normal level, the control circuit performs voltage boosting control to set power supplied to the discharge lamp lower than rated power to prevent excess current consumption by said discharge lamp; and
 whereby the control circuit produces control signals corresponding to the signals from the output voltage detector and the output current detector and supplies the control signals to the DC voltage booster circuit to control the output voltage thereof, and when the DC input voltage falls to lower than a predetermined value, the voltage drop detector varies the reference value of the output current detector in accordance with the drop of the DC input voltage to thereby effect voltage boosting control to set the power supplied to the discharge lamp lower than the rated power.

2. In a lighting circuit for a vehicular discharge lamp having a DC voltage booster circuit for boosting an input voltage from a DC voltage input terminal to provide an output voltage to be applied to the discharge lamp, and a control circuit for varying the output voltage of the DC voltage booster circuit to execute lighting control including constant power control of the discharge lamp, the improvement comprising:

- a protection circuit for cutting off supply of a DC input voltage to the DC voltage booster circuit when the DC input voltage has dropped below a normal level to a level at which lighting of the discharge lamp is no longer possible, and allowing the DC input voltage to be supplied again to the DC voltage booster circuit when the DC input voltage has been restored to, be equal to or greater than a predetermined value, thereby to prevent damage or destruction of circuit elements of said lighting circuit, wherein the protection circuit includes:
- an output voltage detector for detecting that the DC input voltage has dropped to or below a predetermined value; and
- a power cutoff circuit having a relay, for determining whether to permit or inhibit supply of the DC input voltage to the DC voltage booster circuit in accordance with an operation of the relay,
- whereby when the DC input voltage has dropped to or below the predetermined value, the relay of the power cutoff circuit is rendered to cut off the supply of the DC input voltage to the DC voltage booster circuit in response to a signal from the input voltage detector.

* * * * *